United States Patent
Zhang

(10) Patent No.: US 10,113,731 B2
(45) Date of Patent: Oct. 30, 2018

(54) REMOTE CONTROLLER AND REMOTE CONTROL DISPLAY SYSTEM

(71) Applicant: BOE TECHNOLOGY GROUP CO., LTD., Beijing (CN)

(72) Inventor: Xiao Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 9 days.

(21) Appl. No.: 15/079,275

(22) Filed: Mar. 24, 2016

(65) Prior Publication Data

US 2016/0306443 A1 Oct. 20, 2016

(30) Foreign Application Priority Data

Apr. 20, 2015 (CN) .......................... 2015 1 0187677

(51) Int. Cl.
*F21V 23/04* (2006.01)
*G06F 3/042* (2006.01)
(Continued)

(52) U.S. Cl.
CPC ........ *F21V 23/0464* (2013.01); *G06F 3/0425* (2013.01); *G06T 7/70* (2017.01);
(Continued)

(58) Field of Classification Search
CPC ..... F21V 23/0464; G06F 3/0425; G06T 7/70; G08C 17/00; G08C 2201/30; H04N 2005/4428; H04N 21/42224; H04N 5/4403

See application file for complete search history.

(56) References Cited

U.S. PATENT DOCUMENTS 6,822,683 B1 * 11/2004 Torikai ............... H04N 1/00352
348/207.99
8,441,467 B2 * 5/2013 Han .................... G06F 3/04883
178/18.09
(Continued)

FOREIGN PATENT DOCUMENTS

CN 101098424 A 1/2008
CN 101656016 A 2/2010
(Continued)

OTHER PUBLICATIONS

First office Action dated May 17, 2017 in corresponding Chinese Patent Application No. 201510187677.5.

*Primary Examiner* — Kenneth Bukowski
(74) *Attorney, Agent, or Firm* — Nath, Goldberg & Meyer; Joshua B. Goldberg

(57) ABSTRACT

The present invention provides a remote controller and a remote control display system, which can solve the problem that desired buttons cannot be quickly found when the existing remote controller is used in a dark environment. The remote controller of the present invention comprises: an image signal acquisition unit, used for acquiring an image of an operating surface of the remote controller; a control unit, used for determining the position of a user's finger on the operating surface of the remote controller according to the image acquired by the image signal acquisition unit, to obtain finger position information; and a first sending unit, used for sending the finger position information output by the control unit to a display terminal.

16 Claims, 2 Drawing Sheets

(51) Int. Cl.
*H04N 21/422* (2011.01)
*G08C 17/00* (2006.01)
*H04N 5/44* (2011.01)
*G06T 7/70* (2017.01)

(52) U.S. Cl.
CPC .......... *G08C 17/00* (2013.01); *H04N 5/4403* (2013.01); *H04N 21/42224* (2013.01); *G08C 2201/30* (2013.01); *H04N 2005/4428* (2013.01)

(56) References Cited

U.S. PATENT DOCUMENTS

| | | | |
|---|---|---|---|
| 8,472,665 B2 | 6/2013 | Hildreth | |
| 9,314,173 B2 | 4/2016 | Gu et al. | |
| 2004/0046741 A1* | 3/2004 | Low | G06F 3/0317 345/166 |
| 2009/0002218 A1* | 1/2009 | Rigazio | G08C 17/00 341/176 |
| 2009/0213066 A1* | 8/2009 | Hardacker | G06F 3/016 345/156 |
| 2010/0083109 A1* | 4/2010 | Tse | A63F 13/10 715/702 |
| 2011/0102319 A1* | 5/2011 | Lin | G06F 3/03543 345/158 |
| 2012/0062817 A1* | 3/2012 | Kanbayashi | G02F 1/13338 349/61 |
| 2012/0106972 A1* | 5/2012 | Liu | H04B 10/1149 398/112 |
| 2013/0063349 A1* | 3/2013 | Rankin | G06F 1/3262 345/158 |
| 2013/0127710 A1* | 5/2013 | Simpkins | G06F 3/0304 345/157 |
| 2013/0241890 A1* | 9/2013 | Sharma | G06F 3/0426 345/175 |
| 2015/0163444 A1* | 6/2015 | Yoon | H04N 21/4221 725/37 |
| 2015/0181278 A1* | 6/2015 | Yoon | H04N 21/42218 725/37 |

FOREIGN PATENT DOCUMENTS

| | | |
|---|---|---|
| CN | 101689244 A | 3/2010 |
| CN | 103903418 A | 7/2014 |
| CN | 104519388 A | 4/2015 |
| TW | 201322056 A1 | 6/2013 |

* cited by examiner

REMOTE CONTROLLER AND REMOTE CONTROL DISPLAY SYSTEM

CROSS-REFERENCE OF RELATIVE APPLICATION

This application claims the benefit of priority to China Patent Application No. 201510187677.5, titled "Remote Controller, and Remote Control Display System" and filed on Apr. 20, 2015, the content thereof being incorporated herein by reference.

FIELD OF THE INVENTION

The present invention belongs to the technical field of remote control display, and specifically relates to a remote controller and a remote control display system including the remote controller.

BACKGROUND OF THE INVENTION

A television remote controller is a device for remotely controlling a television, and a user can change channels, adjust the volume, set various parameters, turn on and off the television, and the like, by using the remote controller without walking to the television.

At present, television remote controllers mostly implement control by means of buttons. However, because the buttons of the television remote controllers are densely distributed, it is difficult for a user to quickly find the button on which he/she wants to operate in dark environments. Particularly, it is quite difficult for a user with poor eyesight and the old to quickly find the button that he/she wants to operate on.

SUMMARY OF THE INVENTION

In view of the problem that it is difficult to quickly find desired buttons when the existing remote controller is used in a dark environment, the present invention provides a remote controller and a remote control display system, which allow the desired button to be quickly found in the dark environment.

One aspect of the present invention provides a remote controller, which is provided with an operating surface for operation, and the remote controller includes:
 an image signal acquisition unit, used for acquiring an image of the operating surface of the remote controller;
 a control unit, used for determining the position of a user's finger on the operating surface of the remote controller according to the image acquired by the image signal acquisition unit, to obtain finger position information; and
 a first sending unit, used for sending the finger position information obtained by the control unit to a display terminal.

Optionally, the finger position information includes information on a button corresponding to finger position.

Optionally, the operating surface of the remote controller is a semitransparent surface or a surface with a light transmissive window.

Optionally, the image signal acquisition unit includes a camera, which is arranged inside a housing of the remote controller and faces an inner side of the operating surface.

Optionally, the control unit obtains position information of a finger end, as the finger position information, according to the image acquired by the image signal acquisition unit.

Optionally, the control unit obtains an entire-finger image according to the image acquired by the image signal acquisition unit, and obtains the position information of the finger end by analyzing gray scale of the entire-finger image.

Optionally, the remote controller further includes: a light emitting unit, used for providing a light source for interior of the remote controller.

Optionally, the remote controller further includes: a first ambient light detecting unit, used for detecting brightness of ambient light around the remote controller and controlling whether the light emitting unit emits light or not.

Optionally, the remote controller further includes: a first receiving unit, used for receiving a signal for determining whether the light emitting unit emits light or not, which is sent by the display terminal.

Another aspect of the present invention provides a remote control display system, including a display terminal and any one of the above remote controllers, and the display terminal includes:
 a second receiving unit, used for receiving the finger position information sent by the remote controller; and
 a display screen, used for displaying an image relating to a finger position according to at least the finger position information.

Optionally, the image relating to the finger position includes: a virtual remote controller pattern and a finger pattern at a corresponding position of the virtual remote controller pattern.

Optionally, the display terminal further includes:
 a second ambient light detecting unit, used for detecting brightness of ambient light around the display terminal;
 a system unit, used for determining whether the light emitting unit emits light or not according to detection result of the second ambient light detecting unit, and sending a light emitting instruction to a second sending unit; and
 the second sending unit, used for sending the instruction of the system unit to the first receiving unit.

According to the remote controller and the remote control display system provided by the present invention, when the user's finger operates on the operating surface of the remote controller, the image of the operating surface of the remote controller is acquired by the image signal acquisition unit, the position of the user's finger on the remote controller is detected by detecting the change of the image, the finger position information is sent to the display terminal and displayed on the display terminal, and then the user can learn the position of the finger on the remote controller, that is, learn which button the finger corresponds to, while viewing the image relating to the finger position on the display terminal, so that desired control over the display terminal (e.g. a television) is realized.

The remote controller and the remote control display system of the present invention are suitable for remotely controlling a device with a display function such as a television, a computer and the like within a relatively long distance.

DETAILED DESCRIPTION OF THE EMBODIMENTS

In order that those skilled in the art can better understand the technical solutions of the present invention, the present invention will be further described in detail below in conjunction with the accompanying drawings and specific embodiments.

First Embodiment

Figure 1:
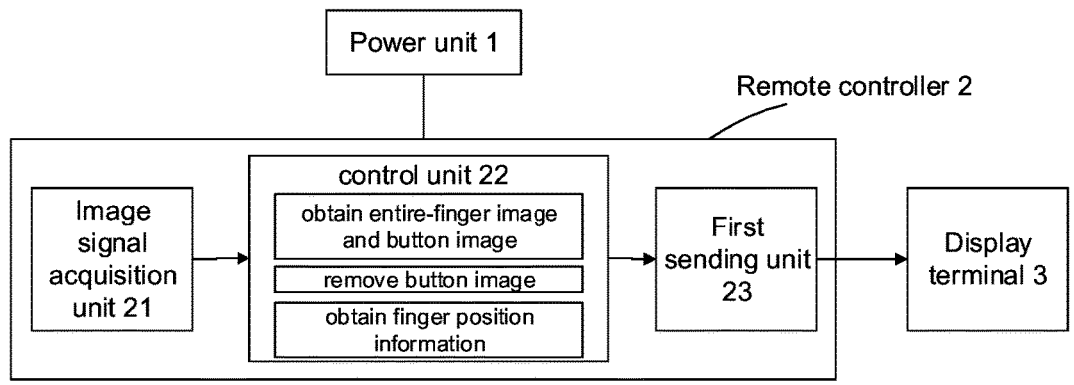
FIG. 1 is a schematic block diagram of a structure of a remote controller in a first embodiment of the present invention.

This embodiment provides a remote controller 2, which is provided with an operating surface (not shown in the figures) for operation. As shown in FIG. 1, the remote controller 2 includes: an image signal acquisition unit 21, used for acquiring an image of the operating surface of the remote controller 2; a control unit 22, used for determining the position of a user's finger on the operating surface of the remote controller 2 according to the image acquired by the image signal acquisition unit 21, to obtain finger position information; and a first sending unit 23, used for sending the finger position information output by the control unit 22 to a display terminal 3.

In order to ensure that the remote controller can be used normally, the remote controller 2 can be connected with a power unit 1 for providing electric energy for the remote controller, and the power unit 1 can be any component conceivable to those skilled in the art, e.g., a battery, a solar panel, etc.

The operating surface refers to a surface provided with buttons of the remote controller, and the display terminal can be controlled by clicking the buttons on the operating surface.

When the user's finger operates on the operating surface of the remote controller 2, the image signal acquisition unit 21 in the remote controller 2 acquires an image of the operating surface of the remote controller, and sends the image to the control unit 22. The control unit 22 detects the position of the user's finger on the remote controller 2 by detecting the change in gray scale of the image, to obtain finger position information, the obtained finger position information is converted into finger position code information, the finger position code information is combined with button code information generated from the button operated by the user to generate combined code information, and the combined code information is sent to the display terminal 3 by the first sending unit 23, so that the display terminal such as a television can be controlled.

The user's finger refers to a body part which makes contact with the operating interface when the user clicks a button on the operating surface to control the display terminal.

Converting the position information into code information is a way of information conversion generally conceivable to those skilled in the art, but the present invention is not limited thereto. Other way of information conversion in the art is also applicable to the present invention.

Optionally, the finger position information includes information on a button corresponding to the finger position.

That is to say, when the image signal acquisition unit 21 acquires the image of the operating surface of the remote controller, the image of the buttons on the operating surface of the remote controller may also be acquired, so that it can be learnt which button the finger corresponds to.

Optionally, the operating surface of the remote controller is a semitransparent surface or a surface with a light transmissive window.

When the operating surface of the remote controller is a semitransparent surface or a surface with a light transmissive window, the image signal acquisition unit 21 can acquire the image of the operating surface of the remote controller more easily.

Optionally, the image signal acquisition unit 21 includes a camera, which is arranged inside a housing of the remote controller 2 and faces the inner side of the operating surface.

That is to say, the image signal acquisition unit 21 is arranged inside the remote controller 2. The structure with such arrangement is simple, and the appearance of the remote controller and the like will not be influenced. When the image signal acquisition unit 21 is arranged inside the remote controller 2, the operating surface is required to be at least partially transparent so as to acquire the image of the finger.

The image signal acquisition unit 21 can also be in other form, as long as it can acquire the image of the operating surface of the remote controller.

Optionally, in order to determine the position of the user's finger on the operating surface of the remote controller according to the image acquired by the image signal acquisition unit 21, the control unit 22 can be configured to execute the following processes:

step 1, obtaining an entire-finger position according to the image acquired by the image signal acquisition unit 21; and step 2, obtaining the position of a finger end as the finger position information on the basis of the entire-finger position.

In an example, the entire-finger image and the button image acquired by the image signal acquisition unit 21 are separated before the user's finger is identified, and then the button image is removed from the acquired image of the surface of the remote controller. Relative to the surface of the remote controller, the button image is static, while the entire-finger image is variable, so in light of this, the user's entire-finger position can be identified.

The user mainly operates the buttons of the remote controller with his/her finger end, so after the entire-finger position is determined in the first step, the position of the finger end is determined in the second step. The movement of the finger end is the largest as compared to other portions of the finger during movement, so in light of this, the finger end image can be determined. Based on the size of a finger of a general person, the 1 cm×1 cm square area at the fingertip is taken as the finger end, and the central position of the square is defined as the position of the finger end, namely the finger position of the user.

In order to obtain the position of the finger end, the control unit 22 can be configured to obtain the position information of the finger end by analyzing the gray scale of the entire-finger image.

That is to say, the outline, position and the like of the finger can be determined by analyzing the gray scale (i.e. shade) of the entire-finger image, and further the position of the finger end is determined.

Second Embodiment

Figure 2:
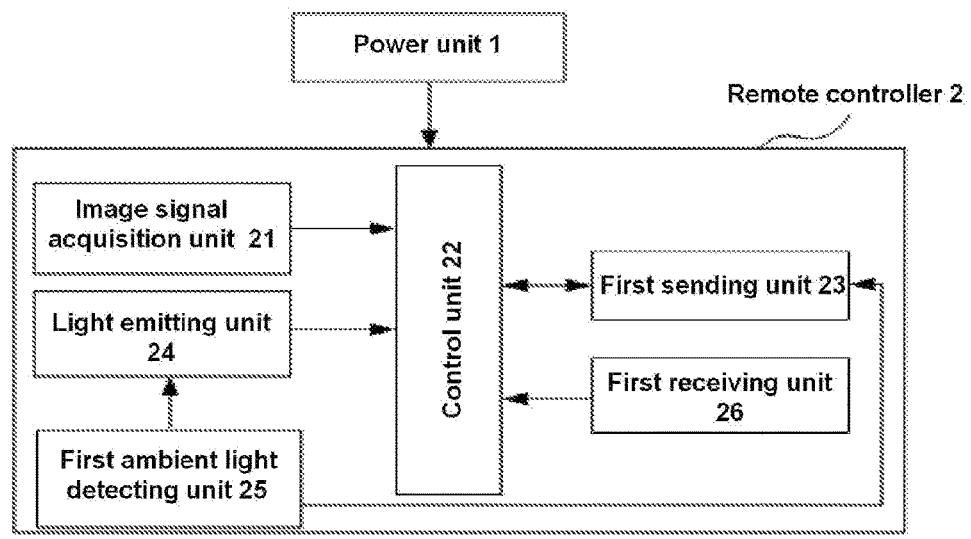
FIG. 2 is a schematic block diagram of a structure of a remote controller in a second embodiment of the present invention.

As shown in FIG. 2, this embodiment provides a remote controller, which has a structure similar to that of the remote controller of the first embodiment, and this embodiment differs from the first embodiment in that: the remote controller 2 further includes a light emitting unit 24, used for providing a light source for the interior of the remote controller 2, so that the user can clearly see the image of the operating surface even if the ambient light is weak.

Optionally, the remote controller 2 further includes a first ambient light detecting unit 25, which is used for detecting the brightness of ambient light around the remote controller 2 and thus determining whether the light emitting unit 24 emits light or not. That is, the light emitting unit 24 does not necessarily emit light all the time, but emits light only when the first ambient light detecting unit 25 detects that the ambient light is weak, thereby facilitating saving power. As an alternative, the remote controller 2 may further include a first receiving unit 26, which is used for receiving a signal sent from the display terminal 3 and used for determining whether the light emitting unit 24 emits light or not, and in this case, the remote controller 2 does not need the first ambient light detecting unit 25, so the structure is simpler.

In an example, a threshold T is set in the control unit 22. When the level of the ambient light signal detected by the first ambient light detecting unit 25 is greater than the threshold T, it indicates that the external ambient light can meet the image acquisition requirement of the image signal acquisition unit 21, and in this case, the light emitting unit 24 inside the remote controller 2 does not need to provide light. When the level of the detected ambient light signal is smaller than the threshold T, it indicates that the external ambient light is very weak and cannot meet the image acquisition requirement of the image signal acquisition unit 21, and in this case, the light emitting unit 24 inside the remote controller 2 needs to provide light. Therefore, the control unit 22 controls the light emitting unit 24 to emit light.

Compared with the situation without the light emitting unit 24, when the brightness of the environment around the remote controller is very low, the image signal acquisition unit 21 can hardly acquire a clear finger image, so the finger position information cannot be obtained. The remote controller 2 provided by this embodiment includes the light emitting unit 24, and can control the light emitting unit 24 to emit light according to the brightness of ambient light around the remote controller 2 to provide a light source for the interior of the remote controller 2, so the user can easily find the button that he/she wants to operate on when the ambient light is weak.

Third Embodiment

Figure 3:
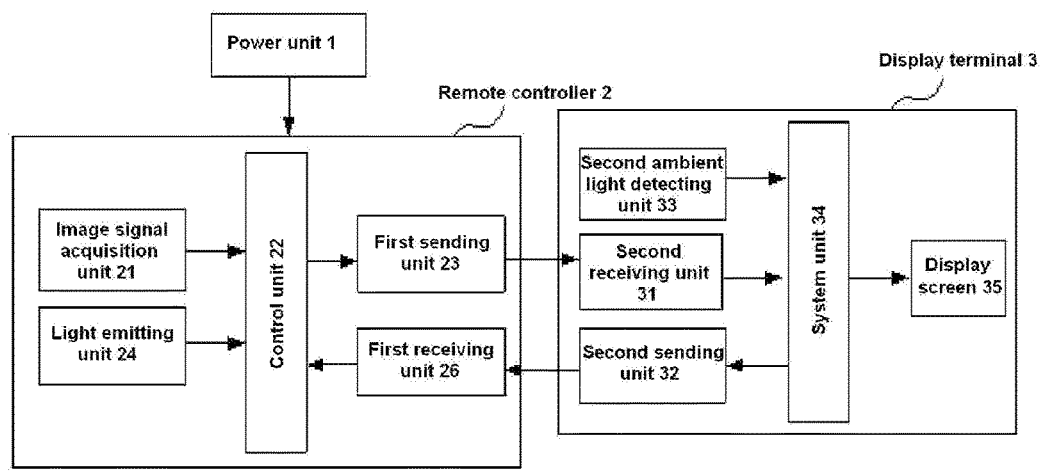
FIG. 3 is a schematic block diagram of a structure of a remote control display system in a third embodiment of the present invention.

As shown in FIG. 3, this embodiment provides a remote control display system, including a display terminal 3 and the remote controller 2 according to any above embodiment of the present invention. The display terminal 3 includes: a second receiving unit 31, used for receiving the finger position information sent by the remote controller 2; and a display screen 35, used for displaying an image relating to a finger position according to at least the finger position information.

According to the remote control display system provided by this embodiment, the finger position on the operating surface of the remote controller acquired by the image signal acquisition unit 21 inside the remote controller 2 can be mapped to a virtual remote controller displayed on the display screen 35, so that the user can control the remote controller through the virtual remote controller displayed by the display screen 35 and the finger position when the ambient light is weak or without observing the buttons of the remote controller, and thus control the display terminal 3.

Optionally, the image relating to the finger position displayed on the display screen 35 includes a virtual remote controller pattern and a finger pattern at the corresponding position of the virtual remote controller pattern.

That is to say, the display screen 35 can display the patterns of both the remote controller and the finger, so that the user can know the position of his/her own finger on the remote controller when viewing the image and can thus find the right button.

The display screen 35 can also display the finger position information in other manner, for example, directly display the number of the button currently corresponding to the finger position.

Optionally, the display terminal 3 further includes: a second ambient light detecting unit 33, used for detecting the brightness of ambient light around the display terminal 3; a system unit 34, used for determining whether the light emitting unit 24 of the remote controller 2 is required to emit light or not according to the detection result of the second ambient light detecting unit 33, and sending a light emitting instruction to a second sending unit 32; and the second sending unit 32, used for sending the light emitting instruction of the system unit 34 to the first receiving unit 26 in the remote controller 2.

That is to say, when the system unit 34 judges that the light emitting unit 24 needs to emit light, the second sending unit 32 sends the light emitting instruction to the first receiving unit 26, so that the control unit 22 controls the light emitting unit 24 to emit light.

The working principle of the second ambient light detecting unit 33 can be the same as that of the first ambient light detecting unit 25, that is, the actually detected brightness of the ambient light is compared with the threshold T to determine whether the light emitting unit 24 needs to emit light or not. The first ambient light detecting unit 25 and the second ambient light detecting unit 33 may not coexist, and it may suffice to have one ambient light detecting unit to detect the brightness of ambient light.

It could be understood that the above embodiments are merely exemplary embodiments adopted for describing the principle of the present invention, but the present invention is not limited thereto. Various variations and improvements may be made by those of ordinary skill in the art without departing from the spirit and essence of the present invention, and these variations and improvements shall also be regarded as falling into the protection scope of the present invention.

The invention claimed is:

1. A remote controller, comprising an operating surface for operation, wherein the remote controller is configured to:
   acquire, by an image signal acquisition unit, an image of the operating surface of the remote controller;
   determine a position of a user's finger on the operating surface of the remote controller according to the image acquired by the image signal acquisition unit, to obtain finger position information; and
   send the obtained finger position information to a display terminal,
   wherein the remote controller is further configured to obtain an entire-finger image and a button image from the image of the operating surface of the remote controller acquired by the image signal acquisition unit, remove the button image from the image of the operating surface of the remote controller, and obtain position information of a finger end, as the finger position information, by analyzing gray scale of the remaining entire-finger image.

2. The remote controller of claim 1, wherein the finger position information comprises information on a button corresponding to finger position.

3. The remote controller of claim 1, wherein the operating surface of the remote controller is a semitransparent surface or a surface with a light transmissive window.

4. The remote controller of claim 3, wherein the image signal acquisition unit comprises a camera, which is arranged inside a housing of the remote controller and faces an inner side of the operating surface.

5. The remote controller of claim 1, further comprising:
a light source, configured to provide light for the image signal acquisition unit to acquire images.

6. The remote controller of claim 5, further configured to:
detect brightness of ambient light around the remote controller and control whether the light source emits light or not.

7. The remote controller of claim 5, further configured to:
receive a light emitting instruction for controlling the light source to emit light, which is sent by the display terminal.

8. A remote control display system, comprising a display terminal and the remote controller of claim 1, wherein the display terminal is configured to:
receive the finger position information sent by the remote controller; and
display, by a display screen, an image relating to a finger position according to at least the finger position information.

9. The remote control display system of claim 8, wherein the image relating to the finger position comprises: a virtual remote controller pattern and a finger pattern at a corresponding position of the virtual remote controller pattern.

10. The remote control display system of claim 8, wherein the finger position information comprises information on a button corresponding to finger position.

11. The remote control display system of claim 8, wherein the operating surface of the remote controller is a semitransparent surface or a surface with a light transmissive window.

12. The remote control display system of claim 11, wherein the image signal acquisition unit comprises a camera, which is arranged inside a housing of the remote controller and faces an inner side of the operating surface.

13. The remote control display system of claim 8, wherein the remote controller further comprises:
a light source, configured to provide light for the image signal acquisition unit to acquire images.

14. The remote control display system of claim 13, wherein the remote controller is further configured to:
detect brightness of ambient light around the remote controller and control whether the light source emits light or not.

15. The remote control display system of claim 13, wherein the remote controller is further configured to:
receive a light emitting instruction for controlling the light source to emit light, which is sent by the display terminal.

16. The remote control display system of claim 15, wherein the display terminal is further configured to:
detect brightness of ambient light around the display terminal;
determine whether the light source emits light or not according to a detection result, and send a light emitting instruction to the remote controller.

* * * * *